UNITED STATES PATENT OFFICE.

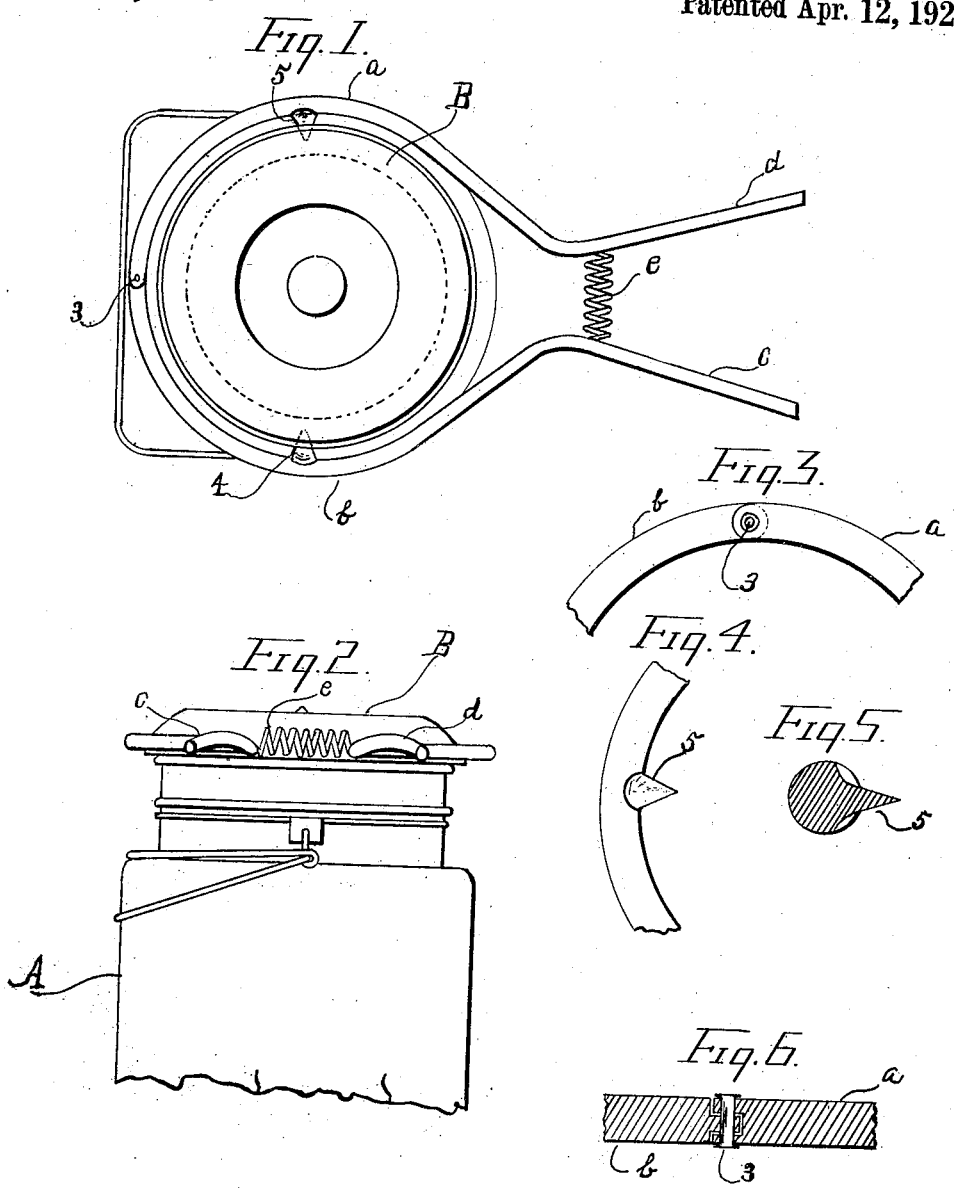

CHARLES F. STANDISH, OF GREENE, NEW YORK.

FRUIT-JAR OPENER.

1,374,612.  Specification of Letters Patent.  Patented Apr. 12, 1921.

Application filed April 12, 1920. Serial No. 373,429.

*To all whom it may concern:*

Be it known that I, CHARLES F. STANDISH, a citizen of the United States, residing at Greene, in the county of Chenango and State of New York, have invented certain new and useful Improvements in Fruit-Jar Openers, of which the following is a specification.

My invention relates to an improvement in fruit jar openers in which the lid of the jar is unloosened by the insertion of pointed wedges on the opposite sides of the cap joint with the jar, and it has for its object a device of the class described, simple and serviceable in construction and inexpensive to manufacture and which can be easily applied to the jar cap of a fruit jar or other receptacle, and which provides means whereby the cover of the jar can be easily removed without damage or danger of injury to the same or the rubber washer or gasket on which the cap rests.

With these objects in view my invention consists in certain novel features of construction and arrangement of parts as are more particularly described and pointed out in the claim, reference being had to the accompanying drawings in which: Figure 1 is a plan view of my device, showing the opener in operative position.

Fig. 2 is an end view of my device in operative position.

Fig. 3 is a plan view of a fragmentary part of my device.

Fig. 4, is a plan view of a fragmentary part of my device.

Fig. 5 is a cross section, plan view of a fragmentary part of my device.

Fig. 6 is a side view in cross section of a part of my device. The same reference characters denote like parts in each of the several figures of the drawings. The jar opener which I provide is specially adapted for removing the covers of glass fruit jars or like receptacles. In this specific form of my device, I provide an encircling collar composed of two circular jaws $a$ and $b$ and at their outer ends projecting into the handle formations $c$ and $d$; the jaws $a$ and $b$ are hinged or pivoted at their inner ends by means of the pivot 3. From the pivot 3 the jaws extend in a semi-circular formation, forming opposite arcs and from the interior face thereof, I have projected in any convenient manner the metal points 4 and 5, adapted to project under the rubber gasket of the top at the opening point between the lid and the jar; between the projecting handles $c$ and $d$, I have mounted the coil spring $e$ for the purpose of controlling the movements of handles $c$ and $d$; in the operation of my device, I apply the same to the jar A by placing it around the cap B at the point of union with jar A—the resilient nature of spring $e$ permitting the jaws $a$ and $b$ to be opened to fit over any varied size of jar, and I then insert the wedge points 4 and 5 in the seam between the lid and the jar, taking hold of handles $c$ and $d$ and drawing them together, and by this leverage pressure upon opening points 4 and 5 so lift the cap as to permit the air to enter the vacuum and thus lift the lid to be opened.

Having thus described my invention, what I claim as new and for which I desire Letters Patent is as follows:

A jar opener comprising a pair of semi-circular shaped jaws pivoted to each other at one end, the other end of each jaw terminating in a handle, pointed opening members integrally formed with the jaw members and projecting inwardly, the said pointed opening members being substantially diametrically opposed, and a spring member mounted between the handles and normally separating the same.

In testimony whereof I have affixed my signature.

CHARLES F. STANDISH.